United States Patent [19]

Michener

[11] Patent Number: 4,802,217
[45] Date of Patent: Jan. 31, 1989

[54] METHOD AND APPARATUS FOR SECURING ACCESS TO A COMPUTER FACILITY

[75] Inventor: John R. Michener, Princeton, N.J.

[73] Assignee: Siemens Corporate Research & Support, Inc., Princeton, N.J.

[21] Appl. No.: 123,692

[22] Filed: Nov. 23, 1987

Related U.S. Application Data

[63] Continuation of Ser. No. 748,487, Jun. 7, 1985, abandoned.

[51] Int. Cl.$^4$ ............................................. H04L 9/04
[52] U.S. Cl. ........................................ 380/29; 380/46; 380/47; 380/65
[58] Field of Search ..................... 380/29, 37, 45–47, 380/50; 364/717; 331/78

[56] References Cited

U.S. PATENT DOCUMENTS

| | | | |
|---|---|---|---|
| 3,781,473 | 12/1973 | Goode et al. | 178/22 |
| 3,958,081 | 5/1976 | Ehrsam et al. | 178/22 |
| 4,133,974 | 1/1979 | Morgan | 178/22 |
| 4,157,454 | 6/1979 | Becker | 178/22 |
| 4,160,120 | 7/1979 | Barnes et al. | 178/22.07 |
| 4,172,213 | 10/1979 | Barnes et al. | 178/22 |
| 4,202,051 | 5/1980 | Davida et al. | 375/2 |
| 4,215,421 | 7/1980 | Giraud | 364/900 |
| 4,268,715 | 5/1981 | Atalla | 178/22 |
| 4,274,085 | 6/1981 | Marino, Jr. | 340/347 DD |
| 4,281,215 | 7/1981 | Atalla | 178/22.08 |
| 4,283,599 | 8/1981 | Atalla | 178/22.1 |
| 4,288,659 | 9/1981 | Atalla | 178/22.08 |
| 4,315,101 | 2/1982 | Atalla | 178/22.08 |
| 4,316,052 | 2/1982 | Feistel | 178/22.06 |
| 4,316,055 | 2/1982 | Feistel | 178/22.06 |
| 4,317,957 | 3/1982 | Sendrow | 178/22.08 |
| 4,322,576 | 3/1982 | Miller | 178/22.07 |
| 4,333,074 | 6/1982 | Sutherland et al. | 340/825.3 |
| 4,341,925 | 7/1982 | Doland | 178/22.17 |
| 4,349,695 | 9/1982 | Morgan et al. | 178/22.08 |
| 4,369,332 | 1/1983 | Campbell, Jr. | 178/22.07 |
| 4,369,434 | 1/1983 | Mueller | 340/347 DD |
| 4,386,233 | 5/1983 | Smid et al. | 380/45 |
| 4,386,266 | 5/1983 | Chesarek | 235/380 |
| 4,408,202 | 10/1983 | Fales | 340/785 |
| 4,423,287 | 12/1983 | Zeidler | 178/22.08 |
| 4,430,728 | 2/1984 | Beidel et al. | 178/22.08 |
| 4,434,322 | 2/1984 | Ferrell | 178/22.14 |
| 4,520,233 | 5/1985 | Smith | 178/22.08 |
| 4,649,233 | 3/1987 | Bass et al. | 380/25 |
| 4,731,843 | 3/1988 | Holmquist | 380/29 |

FOREIGN PATENT DOCUMENTS

| | | | |
|---|---|---|---|
| 0068805 | 1/1983 | European Pat. Off. | |
| DD246663 | 6/1987 | German Democratic Rep. | 364/717 |
| 8301881 | 5/1983 | PCT Int'l Appl. | |
| 1275741 | 3/1984 | U.S.S.R. | 364/717 |
| 2099195 | 5/1982 | United Kingdom | |

Primary Examiner—Salvatore Cangialosi
Attorney, Agent, or Firm—John Francis Moran

[57] ABSTRACT

A security unit is disclosed for controlling access to a main computer system. The security unit provides a comprehensive mechanism for detecting and inhibiting sophisticated attackers. A method of operation and special purpose hardware for implementing this operation are disclosed.

2 Claims, 5 Drawing Sheets

METHOD AND APPARATUS FOR SECURING ACCESS TO A COMPUTER FACILITY

CROSS-REFERENCE TO RELATED APPLICATIONS

This is a continuation of Ser. No. 742,487 filed June 7, 1985, now abandoned.

The present application is related to the commonly-owned U.S. patent application Ser. No. 660,753, filed Oct. 15, 1984 by John R. Michener and entitled "Cryptographic Method and Apparatus Using a *Generalized Rotor*".

BACKGROUND OF THE INVENTION

The present invention relates to a method and apparatus for securing the transmission of data between a remote terminal and a main computer system. More particularly, the present invention concerns a security unit for controlling access to a computer facility such as a data base system, electronic fund transfer system, management information system and the like.

A major problem that has recently become an important public issue is the illegitimate access to computer operations and files. Simple password protection has proven inadequate because of the relative ease with which passwords can be improperly obtained and because of the speed that such passwords may be disseminated, after a breach in security, to other potential abusers of the system. A useful, but limited, technical solution to this problem is the callback method, wherein the potential user calls up the main computer system from a prearranged location, self-identifies, and then breaks the connection. If the user-supplied information is acceptable, the main computer then calls the user back to make the connection. If an improper user (hereinafter called an "attacker") attempts to use the system from a different location, the proper user will be notified of the fact by the call back at his/her location and will be able to change the password(s). Unfortunately, this system is not appropriate for individuals who cannot call from a unique or predetermined set of numbers. Other means must be provided to allow secure access for authorized users who must access the system from various public or non-unique locations.

The first question that must be answered when considering the question of secure computer access is: Against what threat must the system be secure? To be conservative, one must assume that potential attackers of the system are (1) technically competent, (2) have access to considerable computational resources and (3) are capable of wiretapping a user's telephone line. To prevent or restrict the damage that such attackers can do to a computer system places heavy demands upon the method and apparatus for securing access to the system.

Countless schemes have been devised in the past to secure the transmission of data between a remote terminal and a main computer system. The following patents disclose various systems which provide access with a greater or lessor degree of security:

U.S. Pat. No. 3,781,473
U.S. Pat. No. 4,215,421
U.S. Pat. No. 4,268,715
U.S. Pat. No. 4,281,215
U.S. Pat. No. 4,283,599
U.S. Pat. No. 4,288,659
U.S. Pat. No. 4,315,101
U.S. Pat. No. 4,316,055
U.S. Pat. No. 4,317,957
U.S. Pat. No. 4,322,576
U.S. Pat. No. 4,349,695
U.S. Pat. No. 4,386,266
U.S. Pat. No. 4,408,202
European Patent Application No. 68,805
PCT Application No. WO83/02343

From these patents it is known to provide a remote terminal or modem with a fixed identification number for self-identification. It is also known to provide personal passwords, such as a personal identification number (PIN) coupled with the name of the user. It is also known to encrypt the transmitted data using a master key which is constant for a relatively long period (e.g., one month). Furthermore, it is known to supply a new password to each remote terminal after each transaction.

The U.S. Pat. No. 4,386,266 discloses a computer security system in which the PIN of a terminal user is encrypted using a first encryption key to give a first resultant. This first resultant is concatenated with a terminal-generated random number, and then this concatenated number is encrypted, using a second encryption key, to generate a double encrypted, personal identification number. The double encrypted PIN is sent to a main computer along with account identification data. The double encrypted number is decrypted using the second encryption key to yield the first resultant and this first resultant is compared with the validation number and the account identification data stored in the data base of the main computer.

Most of the systems disclosed in the above-noted patents are relatively complex and therefore expensive. Furthermore, these systems are subject to compromise by a sophisticated attacker who has tapped the transmission line and broken the encryption algorithm. Under this condition, the attacker can simply read the next transaction number/variable password and use this information to compromise the system. Since the master key for encryption is constant for a long period of time—e.g., one month—the attacker will have sufficient time to compromise the system.

SUMMARY OF THE INVENTION

It is an object of the present invention to provide a system (both method and apparatus) for securing the transmission of data between a remote terminal and a main computer system to prevent unauthorized access to the data in, and to the operations of, a computer system by an attacker who is technically competent, has unlimited computational and financial resources, and is willing to wiretap telephone lines to achieve his goal.

This object, as well as other objects which will become apparent from the discussion that follows, are achieved, according to the present invention, by means of a "security unit" associated with the remote terminal which implements the following procedure in gaining access to the main computer system:

(a) Calling the main computer system from a local telephone line to request access;

(b) Transmitting, via the telephone line:

(i) in the clear, a first message including a security unit identification number;

(ii) encrypted, a second message including a personal identification string entered into the remote terminal by the terminal user, a first internal password, generated automatically by the security unit, and the telephone number of the calling telephone;

(c) Awaiting and receiving a telephone callback message from the main computer system; and (d) Upon callback, transmitting, via the telephone line:
  (i) encrypted, a third message acknowledging the callback and possibly including a second internal password; and
  (ii) encrypted, a fourth message including the data to be transmitted from the remote terminal to the main computer system.

The callback message from the main computer system preferably includes an enciphered instruction to increment the internal password generator. The next, succeeding password will then be different from the first password.

If desired, the encrypted third message including the second internal password can be omitted. In this case the password next succeeding the first password will occur when a communication link is established again at some later time.

In some telecommunication systems it will be possible for the main computer system to determine automatically the telephone number of the local telephone line. In such cases, it is not necessary (though it may be desirable) for the remote terminal to transmit its telephone number.

As it is used hereinafter, the term "main computer system" is intended to include not only the main computer itself but also its peripheral devices such as a separate central security unit. Such a security unit removes the load from the main computer and prevents the possibility of subversion of the entire system by an attacker who has access to the main computer.

This apparatus and procedure according to the present invention uses a callback system in gaining access to the main computer because such a system permits the determination of the origin of each call, thus allowing the main computer to maintain an audit trail of all the system users. In order to implement this callback system, it is necessary to provide an electronic "key" that is individualized and assigned to a specific user. To serve as a check, this key must have its own unique identification and must include information entered by the user.

According to the invention, the electronic "key" is implemented either by a separate security unit that is individualized to a particular user, or by an individualized electronic key module that may be inserted in a fixed security unit or remote terminal. For very high security access situations, the fixed security unit could measure and digitize personal characteristics of the user (fingerprint, voice, handwriting, physical characteristics) and supply the resultant information to the main computer system for verification. The security unit must have a non-volatile and inaccessible memory, a CPU (i.e., microprocessor) and a standard "smart" modem.

To secure the transmission of data between the remote terminal and the main computer, the security unit operates in conjunction with the remote terminal to implement various procedures and features according to the invention. In particular, each security unit has its own identification number which is communicated in the clear at each attempt to connect the remote terminal to the main computer system. There are two choices concerning the unit identification number: either (1) it cannot be altered without destroying the security unit or (2) it is variable and can be set to values specified by the main computer upon command by the main computer. The second choice is appropriate if it is desired to deny information to a potential attacker about the physical location of specified security units. Such information could be determined by wiretapping the telephone line(s) to the main computer and listening for the identification codes transmitted to the main computer by security units and, thereafter, the telephone numbers that the main computer dialed to contact these units.

Each security unit is preferably issued to only one individual: the person entitled and authorized to use the security unit. That individual should enter a "personal identification string" (such as his/her name, personal password and/or personal identification number (PIN)) when initial connection is attempted. If the security demands are high, each individual is preferably provided with one or more "trap flags" in their sign-on identification string. If a trap flag is activated, the main computer which receives this flag is notified that the security unit and/or its user have been compromised by an attacker. The main computer can then take protective action (such as allowing access only to dummy files) and may initiate counter measures (such as tracing the telephone call and notifying appropriate authorities).

With each successful access to the main computer system, the security unit increments its automatically generated internal password. In this way, the password is different for each callup/callback procedure. Since it is necessary for the main computer system to know and anticipate the internal password of each security unit, these passwords cannot be automatically generated as purely random numbers. The automatic password generator within the security unit should produce a predictable password each time it is incremented, and be designed so that it is resistant to cryptographic assault for its internal state. Such a device might be, for example, a hard-wired storage unit (ROM) or a non-linear shift register having an appropriate feedback loop which changes its contents.

The use of continually changing, automatically generated internal passwords renders the system secure against echo attacks since replaying a previously successful system access code block will not provide access to the main computer. The main computer could also query the security unit on a regular basis—for example, every 60 seconds—requiring the security unit to increment and retransmit its internal password. Routine reverification of the internal password renders the system secure against an attacker taking over the connection once a valid user has signed on. The standard reverification routine may be handled within the security unit without intervention or knowledge by the user.

Finally, if the user attempts to increase the user status within the main computer or to execute prohibited operations, the main computer could require a full sign-on authorization again or could flag the user as being compromised and force the user to re-establish his/her credentials through other channels.

Depending upon the type of system used to encrypt the transmitted data, it may not be necessary to increment the internal password on a regular basis. For example, an encryption system is disclosed in my copending U.S. patent application Ser. No. 660,753 filed Oct. 15, 1984 now abandoned, referenced above, which uses an everchanging key. A diversion attack would be prevented by such a system since the attacker would not have the proper keys.

The security unit includes a cryptographic unit which is able to encrypt messages with a so-called "bit complete" block cryptographic algorithm. The material to be encrypted is the user-specific, personal identification string (name of the user and the passwords entered by the user), the internal, automatically generated password of the security unit and the telephone number from which the user is calling. If a fixed security unit is being used to increase the security, the user information determined by the unit (e.g., fingerprint, voice, handwriting or physical characteristics of the user) should be included in the information to be enciphered in the block. If the material being sent to the main computer does not fill the block, it should be padded with random noise.

To recapitulate, in order to gain access to the main computer system, the user first enters into the remote terminal the appropriate text stream (personal identification string) and the telephone number at his/her location. The security unit associated with the remote terminal makes contact with the main computer and provides its own identification number, followed by the encrypted combination of its current, internal, automatically generated password, the users personal identification string and the telephone number (plus measured user characteristics, if any). The security unit then breaks the contact and waits to receive a callback.

The main computer receives the security unit identification number, looks up its internal state, calculates its encryption keys, decrypts the block and compares the information with what these values should be. If the information provided is acceptable, it then calls back to the telephone number provided in the encrypted message, instructs the security unit to increment its internal state and allows the appropriate communication. If variable identification numbers are used, the main computer also transmits the identification number to be used for the next access of the system.

The communications from the main computer to the security unit are encrypted to prevent attackers from learning the new identification number (if it changes) and to prevent attackers from improperly calling up the security unit and instructing it to increment its state, thus desynchronizing the main computer and the security unit.

While the method and apparatus of the present invention does not require any additional effort or work on the part of the user than is required by presently known systems, the effect of the system according to the invention is to generate password information that changes with each access. The main computer can therefore maintain a record of where each call originated from, the user who accessed it, and the time of access. Encryption of the sign-on block prevents attackers from changing the specified telephone number and inhibits access to the internal, automatically generated passwords and the user text string. If re-verification is used, the internal, automatically generated password is preferably encrypted before transmission to prevent a wiretapper from easily obtaining the previous states from the internal password generator.

A security unit of the type just described encrypts communications to, and decrypts communications from the main computer system. By making the encryption key equal to or dependent upon the internal, automatically generated password, the encryption key would differ with each message but could be easily determined by the local security unit and the main computer. If the message streams become corrupted due to noise or deliberate scrambling in the lines, a reverification of the user's status—incrementing the internal password—would reset the encryption key and resynchronize the security unit with the main computer.

My U.S. patent application Ser. No. 660,753 filed Oct. 15, 1984 now abandoned for "Cryptographic Method and Apparatus Using a 'Generalized Rotor'" discloses generalized rotor cryptographic operators and a bit-complete substitution-permutation network system which is well suited for the encryption needs of the security unit. If it is desired to transmit individual characters or arbitrary short character strings, a generalized rotor substitution stream cipher can be used. If large blocks of text are to be sent, substitution-permutation block codes may be used without loss of transmission efficiency while increasing the cryptographic security.

If it is desired to use a standard encryption method, such as the U.S. Government Data Encryption Standard (DES) System, the security can be enhanced by the use of "duplex" operation in accordance with the invention. In this mode, one DES circuit (available as an integrated circuit or "chip") is operated in auto-feedback mode with its output blocks being used for the encryption keys of another DES circuit connected for block processing the text. This arrangement may be further elaborated, according to the invention, by having shift registers or still another DES circuit modulate the key of the encryption key generation unit.

Duplex operation is usable with any strong block code system and results in perpetually changing encryption keys within any given text stream. A brute force attack that yields the value of any particular encryption key only yields the key used for a single encryption block. Analysis for the "source key" is much more difficult. As above, the source key would be a function of the internal, automatically generated password, yielding a system that would never identically encrypt a message. If the users of the security access control system are not issued the entire security unit for connection to a remote terminal, they must be issued more than just the memory that contains all the codes and status information. If fixed security units were to be used with the user inserting a memory block that contains all the codes and status information, an intelligent attacker could modify a fixed security unit to read its internal states and its user access codes. The attacker would then have free access to the network.

If the memory and the security processors are packaged together in a shielded and screened unit with a limited number of contacts for operating the security unit, the internal states of this unit would be hidden from an attacker. Since some users would require access to several main computer systems, it is necessary that security units be small and easily carried. Fortunately, the cryptographic and access functions are simple and easy to implement in hardware.

If it is desired, it is possible to install a countdown circuit in the security unit that designates the amount of access time remaining for which the user has credit and/or authorization. The main computer could query the user on a regular basis—e.g., every 60 seconds—and require that the security unit supply its current, internal, automatically generated password and decrement its access time counter. The access time counter could be coupled to, or made part of the verification shift register to prevent tampering. If only a relatively small number of accesses are needed and permitted, a stored list of internal passwords could be used, rather than a non-linear shift register. Once the passwords are used up, the user would no longer have access to the main computer system and would have to have the security unit reset and supplied with a new list of internal passwords.

In the preferred embodiment the security unit comprises a CPU which coordinates data flow between the remote terminal and the modem connected to the telephone line. The CPU is provided with a random access memory (RAM); a read only memory (ROM); an internal password generator and a cryptographic module.

The generalized rotor system is well suited as a cryptographic module for it can perform parallel processing of both stream ciphers as well as bit-complete block ciphers. As mentioned above, a DES circuit may also be used for this function.

The main computer is connected via its own modem to the modem of the security units in the field. The main computer operates with software to serve the requirements of the security units. The main computer must possess a non-volatile but updatable memory for storing the appropriate information of all the users (internal state contents, personal identification strings, and user characteristics, if measured by a fixed security unit), all accessible by security unit identification number. It must also have a number of security processors: one for each telephone line that it services in parallel. If a generalized rotor system is used to encrypt the text, the rotor contents can be common for all users of the system, or for groups of users.

When the main computer is contacted by a security unit, it receives an identification number in the clear followed by the information supplied by the user and the security unit. Once the identification number is received, the main computer retrieves from its memory the appropriate information, decrypts the encrypted block and compares the received information to its stored information. If the supplied information is acceptable, the main computer calls the user and sends an enciphered message allowing access to the system and instructing the security unit to increment its internal state. If variable security unit identification numbers are used, the main computer keeps lists of available identification numbers and supplies a new number to the security unit for its next access. In this case, this number is included in the encrypted block sent to the security unit. The previously used identification number is then inserted in the "available for reuse" list of identification numbers.

For a full understanding of the present invention, reference should now be made to the following detailed description of the preferred embodiments of invention and to the accompanying drawings.

DESCRIPTION OF THE PREFERRED EMBODIMENTS

The preferred embodiments of the present invention will now be described with reference to FIGS. 1-9 of the drawings. Identical elements in the various figures are designated with the same reference numerals.

Figure 1:
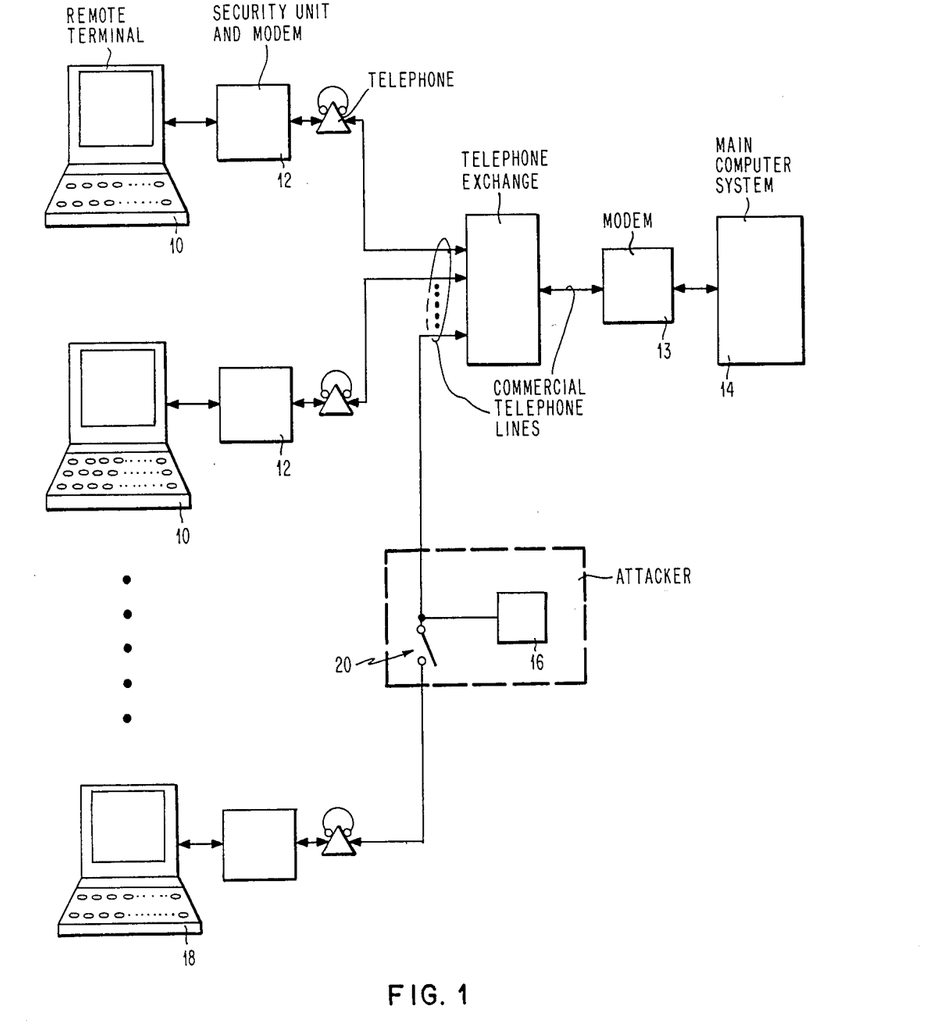
FIG. 1 is a block diagram showing the environment of the security units according to the present invention.

FIG. 1 illustrates the environment and network to which the present invention relates. In this network a number of remote terminals 10 having associated portable security units and modems 12 are connected via telephone lines and a modem 13 to a main computer system 14 having a large data bank. Authorized users of the terminals may call up information from the data bank and may even cause the information in the data bank to be changed.

For example, the data bank may comprise the financial accounts of a large number of account holders in a banking institution. Users of the remote terminals 10 may obtain account information and may also transfer funds from one account to another.

Obviously, it would be advantageous for an unauthorized attacker if he/she could access to the information stored, and could effect transactions in the main computer. It is assumed that the attacker is able to tap a telephone line with his/her own computer terminal 16 and is even able to disconnect a portable terminal 18 by means of a switch 20 in favor of his/her own equipment.

Another option of an attacker is to capture and use a remote terminal 18 and its associated security unit; however, this misappropriation of equipment increases the exposure of the attacker to discovery.

When an authorized user of a remote terminal 10 and security unit 12 wishes to call up the main computer, he/she proceeds as follows:

(1) The telephone number of the main computer is dialed from any remote telephone; for example, in an office, hotel, or the user's home. The main computer need not know in advance the subscriber number of the telephone which will be used to make the call.

Figure 2:
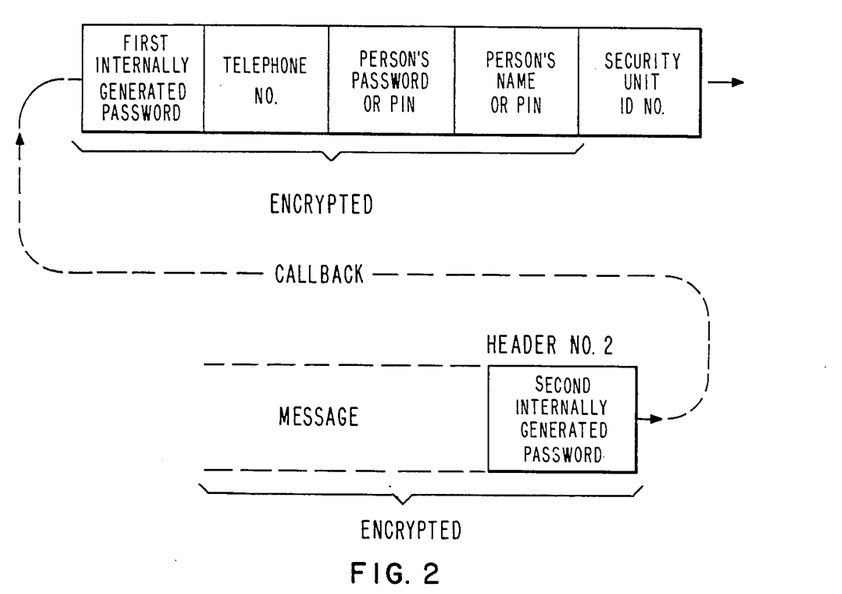
FIG. 2 is a representational diagram showing the messages transmitted by a security unit, according to the present invention, to gain access to the main computer system.

(2) The security unit 12 transmits a first "header" message as shown in FIG. 2 containing, at a minimum, the following information:

(a) The identification number of the security unit;

(b) The user's personal identification string (user's name, password and/or personal identification number (PIN));

(c) The subscriber number of the telephone from which the user is calling; and (d) A first internal password which is automatically generated by the security unit.

The user must type in the information called for in items (b) and (c), above. The internal password (information item (d)) is placed in the message and transmitted automatically. The terminal user will have no knowledge of this password.

The identification number in the first message is transmitted "in the clear". However, all of the other information is encrypted utilizing as secure an encryption algorithm as possible. Advantageously, the internal password may be used to generate an encryption key.

After transmission of the first header, the user of the remote terminal terminates the telephone call (i.e., "hangs up"). Thereafter, the main computer decrypts the encrypted information in the first header and checks the validity of the user's personal identification string and the internally generated password. In particular, the internal password must match the password associated with the specific security unit, identified by the unit's identification number.

If this information in the first header is verified, the main computer returns the user's call by calling the telephone number identified in the header. Upon callback, the security unit answers and may begin by a "handshake" acknowledgement; e.g., by sending to the main computer a second header with a second internal, automatically generated password. Upon receipt, the main computer checks the validity of this second password. If verified, access is granted to the computer databank and an exchange of messages follows.

The second internal password and the subsequent messages transmitted between the remote terminal and the main computer are encrypted.

An advantageous feature of the present invention is the use of a sequence of internal, automatically generated passwords to increase the security of access to the main computer. Even assuming that an attacker is able to decrypt the encrypted data contained in the first header, he/she will not be able to predict the second internal password and therefore will be unable to gain access to the computer by tapping the telephone line.

In order to compromise the system, an attacker must do two things:

(1) Learn the personal identification string (name, PIN and/or password) of an authorized user (either by decrypting a first header or by extorting this information from the authorized user); and (2) Steal or otherwise gain access to a security unit.

In particular, an attacker will be unable to gain access to the main computer by merely knowing an authorized user's personal identification string (PIS) without using the corresponding authorized security unit, or by using an authorized security unit without knowing the corresponding PIS of an authorized user. According to a preferred embodiment of the present invention, the personal identification string includes a "trap flag" which the authorized user can set when forced to disclose the PIS to an attacker. This trap flag, when set, alerts the main computer that the PIS has been compromised.

Figure 3:
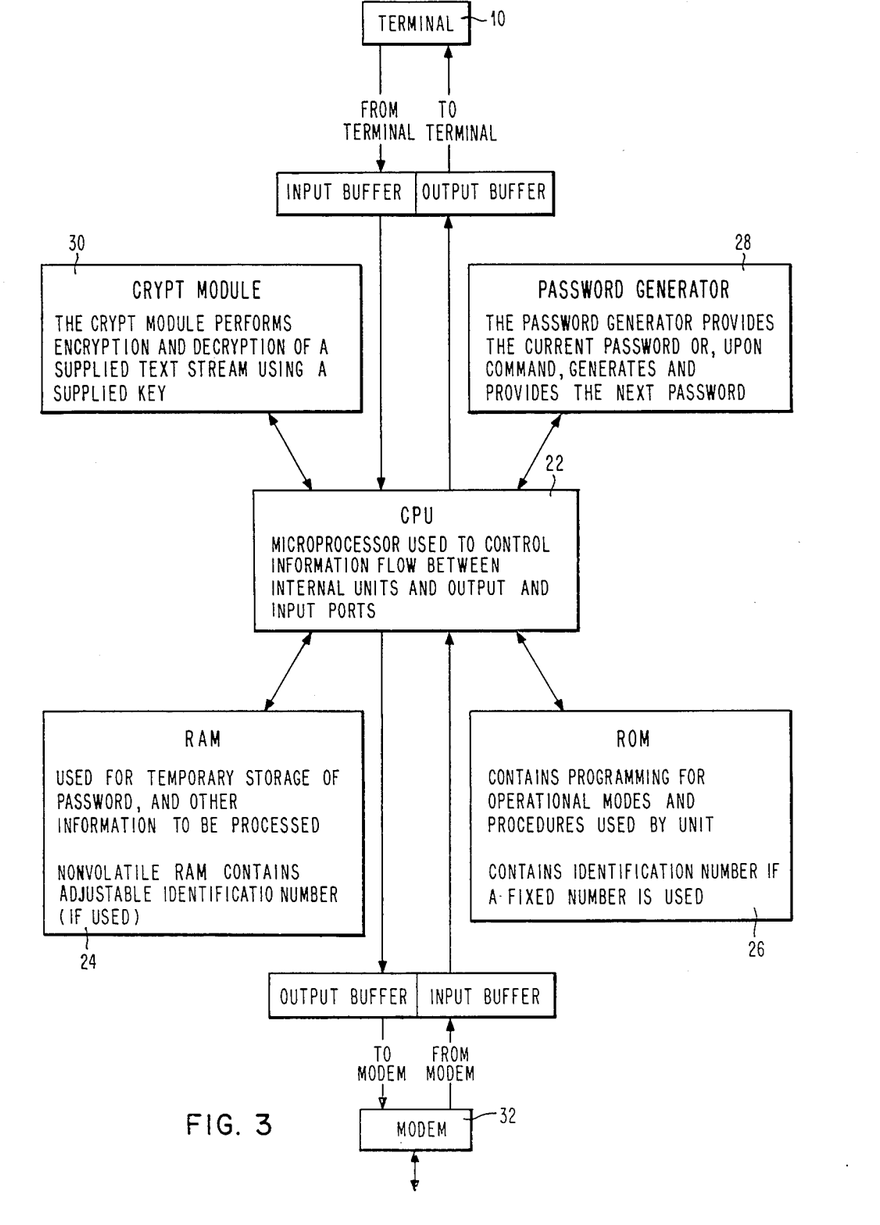
FIG. 3 is a block diagram of a security unit according to a preferred embodiment of the invention.

FIG. 3 shows a preferred embodiment of the security unit and modem 12. This equipment comprises a central processing unit (CPU) 22; a random access memory (RAM) 24; a read only memory (ROM) 26; a password generator 28 and a cryptographic module 30. The CPU 22 establishes communication with the main computer through a modem 32 and controls the information flow between the main computer and the associated remote terminal 10 Input and output buffers are provided, as shown, to temporarily store data as it passes through the security unit.

The CPU 22 or control unit is operated by a program stored in the ROM 26. This program executes an algorithm to perform the following tasks:

(1) Upon request for communications from the terminal 10, the CPU requests the telephone number of the main computer to be contacted, the personal identification string of the user (which is then entered by the user), and the local telephone number (if this number is not permanently stored in the RAM 24 or ROM 26).

(2) The CPU requests the current internal password from the automatic password generator 28.

(3) The CPU supplies the internal password (or a transformed product of the password) to the cryptographic module 30 to serve as a starting key.

(4) The CPU sends the personal identification string, telephone number and internally generated password to the cryptographic module 30 for encipherment.

(5) The CPU retrieves the security unit identification number from the RAM 24 (if this number is adjustable) or the ROM 26 (if this number is fixed).

(6) The CPU sends the identification number in the clear followed by the encrypted personal text string, telephone number and internal password to the main computer via the modem 32.

(7) If a callback is received from the main computer, the CPU passes encrypted data received from the main computer to the cryptographic module 30 for decryption. The CPU responds appropriately to the decrypted data, for example by passing it through to the terminal 10.

(8) Upon instruction by the main computer, the CPU increments the internal password generator 28 generating the next password. If variable identification numbers are used for the security unit, the CPU changes the identification number in the manner indicated by the main computer. The CPU then sends a handshake acknowledgement to the main computer which may include the second internal password.

(9) The CPU has the cryptographic module 30 encrypt data received from the terminal 10, and passes this encrypted text to the modem 32 for transmission to the main computer.

(10) The CPU receives encrypted data from the modem 32, has this data decrypted by the cryptographic module 30 and passes the decrypted data to the terminal 10.

As may be seen, the CPU 22 merely executes routine data handling functions in a repetitious manner. The software for operating the CPU is accordingly straightforward and relatively brief so that an average programmer may produce such software in a reasonable time using only routine skill.

The hardware shown in FIG. 3 consists of "off the shelf" components with the exception of the password generator 28 and the cryptographic module 30. Therefore these two elements deserve some further explanation.

The internal, automatic password generator 28 is basically a pseudo-random number generator which, when incremented, produces the next number (password) in sequence. The pseudo-random number string is, of course, known in advance to the main computer so that, given the current value of the string, the main computer knows, in advance, what the next password should be.

Figure 4:
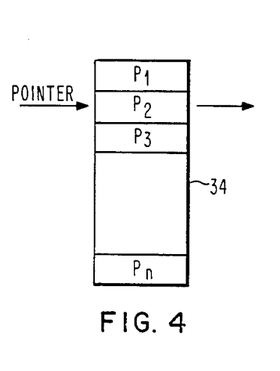
FIG. 4 is a block diagram representing one technique for automatically generating internal passwords in the security unit.
Figure 5:
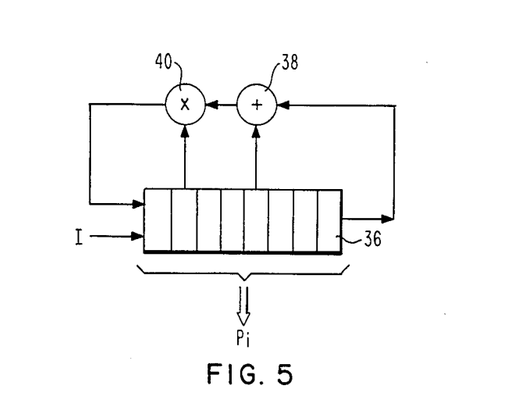
FIG. 5 is a block diagram representing another technique for automatically generating internal passwords in the security unit.

Although any type of pseudo-random number generator would be suitable as the internal password generator 28, FIGS. 4 and 5 give two examples of generators that may be used. The internal state of the password generator should be resistant to analysis given a long series of passwords. FIG. 4 shows a memory (e.g., a ROM) or a pushdown stack 34 in which is stored a list of passwords $P_1$, $P_2$, $P_3$ ... $P_n$. These passwords may be permanently stored in the memory 34 or supplied, on request, by the main computer. The passwords $P_1$, $P_2$, $P_3$, etc., are successively read out by an address pointer which is incremented on command from the CPU 22.

Shift registers using the arithmatic operations of addition or exclusive-ORing are well established procedures for generation of pseudo-random number strings. Such a device is shown in FIG. 5. As may be seen, an 8-bit shift register 36 is used to produce an 8-bit password $P_i$. This register is incremented by a pulse at input "I" from the CPU 22. When incremented, bits are passed to an adder 38 and to an exclusive ORgate 40 which supplies a new bit to the input of the shift register.

The circuit of FIG. 5 is only exemplary of a class of pseudo-random number generators which are implemented with a shift register. Although this example is implemented in base 2, the same procedure may be used for pseudo-random number generators for larger bases ($2^n$) of the type described by D. E. Knuth: *The Art of Computer Programming*, Vol. 1, 2nd Ed., Chapter 3; Addison-Wesley; Reading, Mass. (1981). Unfortunately, the linear nature of the pseudo-random sequences produced by such pseudo-random generators allows the contents of the shift registers to be determined from a small amount of generator output. The use of non-linear mixing operations makes the sequences harder to invert, but makes the mathematical analysis of the behavior of the system difficult or impossible to predict, and may decrease the period of the output sequence.

The cryptographic module 30 may be implemented by the generalized rotor system referred to above and disclosed in my co-pending U.S. patent application Ser. No. 660,753, filed Oct. 15, 1984 now abandoned. Such a system is well suited for parallel processing and can perform the basic cryptographic operations on both stream ciphers as well as bit-complete block ciphers. The shift registers used to generate the rotor choice and rotor offset values can run in parallel, putting their output into delay lines of variable length so that each character is enciphered with the appropriate rotor values. While each rotor stage operates sequentially, all these stages together process data in parallel, resulting in a high throughput. Reference should be made to the aforementioned patent application for details of this implementation.

Alternatively, the cryptographic module 30 can be implemented by any other suitable cryptographic algorithm which offers the desired degree of security. Strong cryptographic block transformations are non-linear transformations where every bit of the output depends upon every bit of the input as well as the cryptographic key. A change of any one bit in the key or in the input block results in each bit of the output block independently having about a 50 percent chance that it will change, with no predictable pattern in the changes. An example of such a mixing operation is the U.S. Governments Data Encryption Standard (DES) which has now been implemented on integrated circuits. If the high speed of the generalized rotor is not required and it is desired to use standard encryption procedures, a cryptographic module based upon the DES is capable of high security.

Since the system key size is small with a typical, DES processor circuit (chip), multiple encryption is recommended so as to increase the cryptographic security against brute force assaults. This requires sequential processing of the plaintext through separate DES processors (each of which has its own key). In this case the keys for the transformations remain constant for each block of text that is processed. It is preferable, however, to use a system that uses a larger key size. Furthermore, security would be further increased if the working key were to change during the course of encryption since an attacker would then be unable to test out trial solutions of one text block on other text blocks.

Figure 6:
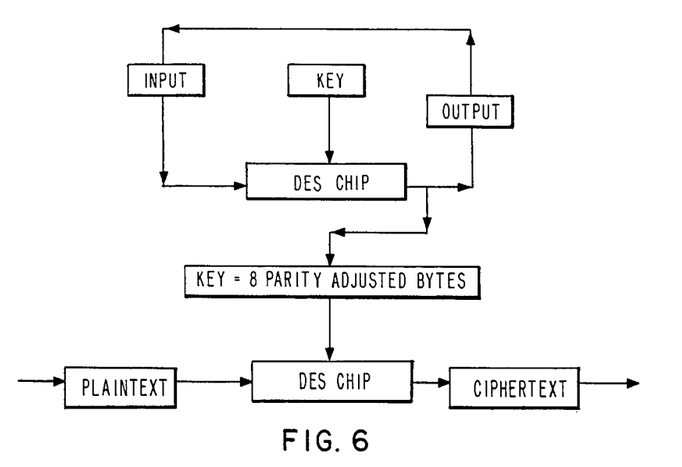
FIG. 6 is a block diagram of a cryptographic module for use in the security unit, according to a first preferred embodiment of the present invention.

According to another aspect of the present invention, a "duplex" DES-based scheme is provided which fulfills these requirements. The simplest version of this scheme is a dual DES arrangement ia which a DES key generator composed of a DES chip loaded with a key and a starting text block is used to generate keys for a second DES encryption chip, as shown in FIG. 6. The key generator performs sequential transformations of the text block under action of the fixed key. The output of the key generator is adjusted for parity and used as the encryption key for the second DES chip. The key for the system is composed of the key and starting block of the key generator unit. Such an arrangement is analogous to pseudo-random generators utilizing the linear congruential method.

The key generator generates a long period cycle of output blocks. A cycle is established as soon as an earlier value is repeated. Since the DES mapping is apparently random and is sensitive to a single bit change in the input, we can estimate the average period on a statistical basis. Since there are $2^{64}$ possible blocks and, on the average, each is equally likely, the expected period of the key generator is $2^{63}$ blocks. A known plaintext attack on this system will yield the consecutive keys used by the encryption chip. These keys are composed of 56 bits of the 64 bit output blocks of the key generators. Since it is known that the transformation key is kept constant, the attacker must determine what input block and transformation key yield the known output block. The uncertainty in knowledge of the output block by a factor of 256 per block (due to the use of 1 bit per byte as a parity bit) adds to the attacker's difficulties. The uncertainty in knowledge of the output of the key generator increases the search space to $2^{128}$ ($2^{64}$ due to the generator input block, $2^{56}$ due to the generator key, and $2^8$ due to the uncertainty in the analyst's knowledge of the output of the key generator). This search space is larger than the search space for the conventional double DES encryption procedure.

The system security can be increased significantly at very little cost by increasing the size of the input text block and selecting the transformation key from the text block as well. This is the case of the random operator shift register. Such a shift register is implemented with a block of memory to contain the register contents, a processor to control the feedback connections and processing of the DES chip, and a DES chip to serve as a nonlinear feedback element. The output of the shift register is used as a variable key for the second DES chip which performs the encipherment. The memory may be structured as blocks which are used as such or as a series of bits from which the key and text blocks are read.

Figure 7:
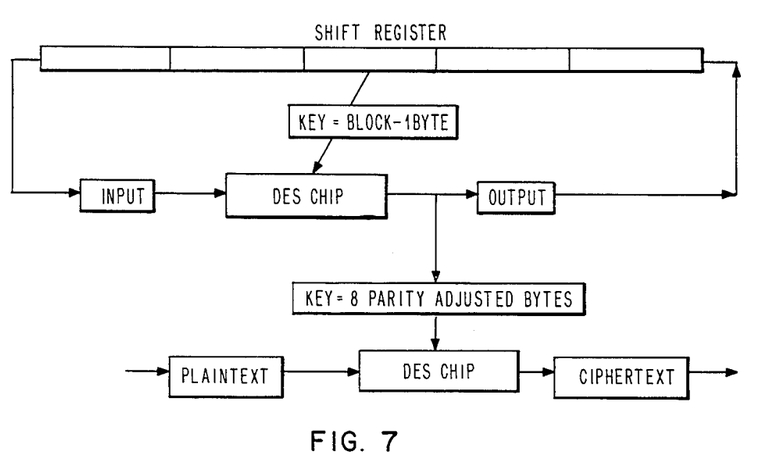
FIG. 7 is a block diagram of a cryptographic module for use in the security unit, according to a second preferred embodiment of the present invention.

Consider the case where the memory is structured as an array of k blocks (each block Is one block code length long) with taps at the $i^{th}$ and $j^{th}$ blocks. The feedback is determined by the DES transformation (cipertext block=DES [key, plaintext block]). The shift register would be controlled by its feedback relation: block(k)=DES[block(k−i), block(k−j)]. Such an arrangement is shown in FIG. 7. The contents of block(0) through block(k−1) constitute the system key. As the routine is used, sequentially higher values of k are used. This procedure is easily implemented in hardware as well as software; it results in continually changing values of the "key" and "data" blocks being transformed. After the routine has cycled through the array several times, each bit in the block is dependent upon the value of every bit of the initial contents of the register array.

Assume that the blocks are p bits long and that the keys are a set/subset of the block with a length of q bits, $q <= p$. Since cryptographic block transformations are reversible and unique, each input block can map into $2^q$ distinct output blocks (as a result of the $2^q$ keys). The probability that a given input block can map to a specified output block is $2^{(q−p)}$. The probability of that particular mapping is $2^{-q}$. The probability of obtaining a specified output block given a randomly chosen input block and a randomly chosen key is $2^{-p}$.

During iteration of the shift register each block is used twice: once as an input block and once as a key, when q bits are used. The shift register will repeat itself only when all the blocks in the shift register are the same as they were at some earlier time. Since the chance of a given output block occurring is $2^{-p}$, the chance of n consecutive specific blocks appearing is $2^{-np}$. This results in an expected period length of $2^{np}$ blocks=$2^{(n+1)p}$ bits, somewhat longer than the period of a maximal length linear feedback shift register with np bits ($=2^{np}-1$).

Further complexities can be introduced by reading the key and block to be transformed on a bit by bit basis from a memory block. In such a case the controlling microprocessor would read in the appropriate number of bits for the key and transformation block from the appropriate locations in the register. If the register length is chosen to be relatively prime to the lengths of the key and block, analysis is made more complicated because of the steadily changing locations of the key and data blocks within the register. Such a process effectively increases the period by the product of the lengths of the register, the key block, and the transformation block (with common factors only appearing once).

Figure 8A:
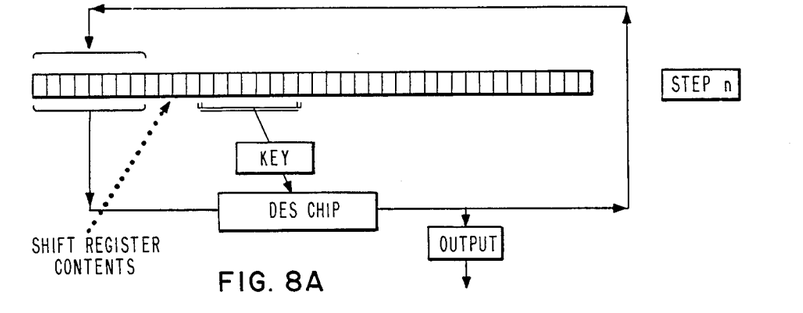
FIGS. 8A and 8B are block diagrams illustrating successive stages of operation of the key-generating hardware in a cryptographic module, according to a third preferred embodiment of the present invention.
Figure 8B:
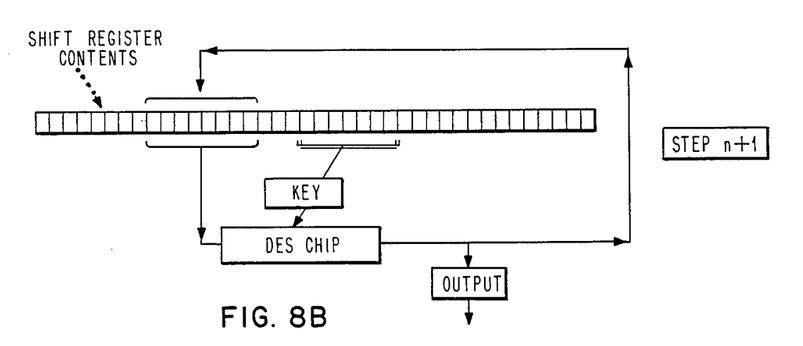

More particularly, the key length of the DES is 7 bytes while the block length is 8 bytes. If the length of the shift register is chosen to be relatively prime to the key length (7 bytes) and block length (8 bytes) and if, after each operation of the DES chip, the key and text blocks are incremented by their respective lengths, the feedback within the shift register is made much more complex and hard to analyze. A schematic of this arrangement is shown in FIGS. 8A and 8B.

Inversion of the output of such random operator shift registers will be very difficult because of the multiplicity of potential mappings that are available for each output block of the sequence and the complex mixings that occur within the shift register.

Random operator shift registers can be expected to be excellent generators of pseudo-random number sequences. These sequences can be used directly, byte by byte, for stream encryption by modulus addition or exclusive-ORing. They can also be used block by block to provide an everchanging keystream to another DES chip which processes the plaintext. Since both chips would work in parallel, the encryption speed would not be slowed down, but the security of the system would be significantly increased. An attacker would be forced to work backwards, determining the sequential keys to the encryption chip and from those keys, attempt to determine the contents of the shift register—a very difficult task.

While random operator shift registers are not dependent upon hardware implementations of cryptographic transformations, high speed encryption and decryption operations will require hardware implementation of the mixing operation. The DES system, while readily commercially available, is not the only mixing transformation that may be used. The generalized rotor system is also suitable for random operator shift register construction as a byte as well as a block operator. It is also well suited for high speed hardware implementation.

It is possible to construct arbitrary combinations of such shift registers using block mixing chips as nonlinear algebraic elements. The ready availability of the DES chips and the ease of wiring them in parallel allows the construction of complex cryptographic systems which are both fast and difficult to analyze. Unfortunately, the complexity of the block mixing transformation used in the construction of these systems makes the prediction of their behavior virtually impossible. If it is necessary to use systems that can be theoretically modeled, linear feedback shift registers may be mixed with such block transformations to hinder backward analysis of the shift register contents, taking advantage of the nonuniqueness of the mixing when both the key and the block are being mixed. Such a mixer is shown in FIG. 9.

Figure 9:
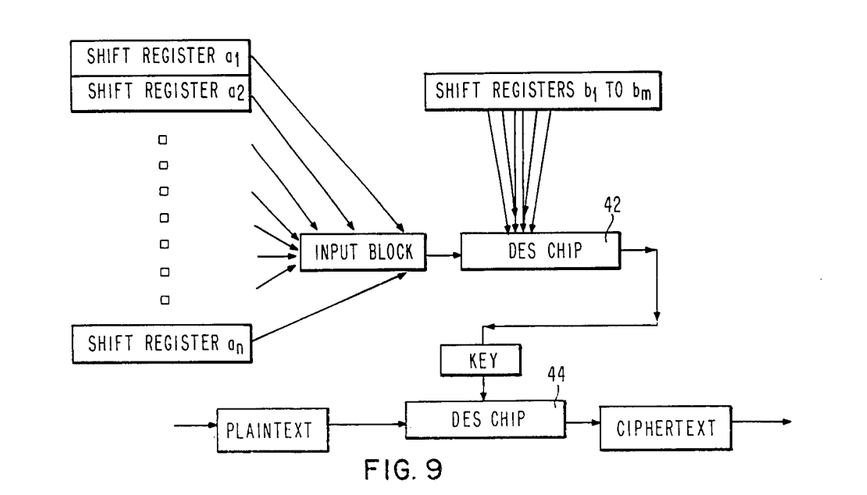
FIG. 9 is a block diagram of a cryptographic module for the security unit, according to a fourth preferred embodiment of the present invention.

In the arrangement of FIG. 9, the first DES chip 42 which generates the key for the second DES chip 44 mixes the contents of the shift registers $A_1$ to $A_n$ and the shift registers $B_1$ to $B_n$. It will be understood that the contents of these registers may be supplied sequentially or in any arbitrary order.

There has thus been shown and described a novel system for securing access to a computer facility which fulfills all the objects and advantages sought therefor. Many changes, modifications, variations and other uses and applications of the subject invention will, however, become apparent to those skilled in the art after considering this specification and the accompanying drawings which disclose preferred embodiments thereof. All such changes, modifications, variations and other uses and applications which do not depart from the spirit and scope of the invention are deemed to be covered by the invention which is limited only by the claims which follow.

What is claimed is:

1. Apparatus for generating an essentially non-invertable stream of pseudo-random blocks via a mixer of pseudo-random sequences, the mixer comprising:
   first means comprising a first plurality of pseudo-random sequence generators for supplying successive pseudo-random block sequences each block from a successive one of the pseudo-random sequence generators as successive encryption key blocks;

second means comprising a second plurality of pseudo-random sequence generators for supplying successive pseudo-random block sequences each block from a successive one of the pseudo-random sequence generators as successive input blocks;

first means for switching from one pseudo-random sequence generator to another one in said first plurality to obtain new values for the next encryption key block;

second means for switching from one pseudo-random sequence generator to the next one in said second plurality to obtain new values for the next input block; said second means for switching and said first means for switching operating synchronously so that each new input block has a corresponding new encryption key block;

means for mixing each encryption key and each input block utilizing a cryptographic block code according to the Data Encryption Standard (DES) algorithm; where each encryption key block is supplied by said first means for switching and each input block is supplied by said second means for switching; and means for outputting the resulting output block to provide the essentially non-invertable stream of pseudo-random blocks.

2. Apparatus for generating an essentially non-invertable stream of pseudo-random blocks according to claim 1, wherein said first means provides blocks of fifty-six bits each and said second means provides blocks of sixty-four bits each.

* * * * *